CIRCUIT FOR TWO-WAY PULSE TRANSMISSION OF INTELLIGENCE VIA PLURAL MULTIPLEX CHANNELS PARTICULARLY WITH PROVISION FOR SWITCHOVER TO SINGLE CHANNEL OPERATION

Filed April 27, 1964

CIRCUIT FOR TWO-WAY PULSE TRANSMISSION OF INTELLIGENCE VIA PLURAL MULTIPLEX CHANNELS PARTICULARLY WITH PROVISION FOR SWITCHOVER TO SINGLE CHANNEL OPERATION

Filed April 27, 1964

United States Patent Office 3,449,520
Patented June 10, 1969

3,449,520
CIRCUIT FOR TWO-WAY PULSE TRANSMISSION OF INTELLIGENCE VIA PLURAL MULTIPLEX CHANNELS PARTICULARLY WITH PROVISION FOR SWITCHOVER TO SINGLE CHANNEL OPERATION

Hans Höschler, Munich, Germany, and Günther Kraus, Vienna, Austria, assignors to Siemens Aktiengesellschaft, a corporation of Germany Filed Apr. 27, 1964, Ser. No. 362,873
Claims priority, application Germany, Apr. 29, 1963, S 84,993
Int. Cl. H04j *1/08*
U.S. Cl. 179—15 35 Claims

ABSTRACT OF THE DISCLOSURE

The exemplary embodiments show a time multiplex central system with subscribers' lines being connected for two-way communication by means of a pair of multiplex channels having a pair of central intermediate storers connected therewith and respectively employed during a first multiplex interval to receive pulse energy from the line storers of calling and called lines, and during a second multiplex interval to transmit the pulse energy to the respective line storers of such lines. Provision is made for fault-responsive switchover to single channel two-way communication. Cyclic storers for the respective multiplex channels store the addresses of the calling and called subscribers respectively with provision for fault-responsive transfer therebetween of the addresses of preferred subscribers so as to maintain communication therebetween in spite of a fault.

The invention relates to a circuit which can be used especially for central systems which operate according to the multiplex principle, and which may be utilized, for example, for telephone purposes. A time multiplex central system, as is well known, is characterized in that the messages to be transmitted modulate impulse sequences which are staggered with respect to each other and thereby permit a multiple utilization of connection lines. Over the circuit mentioned, upon connection demands, the subscribers are connected with each other in pairs, with the connections extending in each case over at least one multiplex bar. For this purpose, in each case, the switches belonging to the circuit are closed synchronously with the pulses of pulse sequences staggered relative to one another, and are open during the pauses between pulses. These switches are situated, for example, in line sections which lead to subscriber stations, and because of the special manner of operation of the switching circuit under consideration, the opening periods of the switches are always considerably longer than their actuated periods. It is possible, however, only during the actuated time or period for energy to be transmitted over the switches involved. Such energy transmission, therefore, takes place in pulses, but as a result of the long opening periods, the transmission of energy is severely impaired, unless special meaures are taken.

In order to prevent this impairment of the energy transmission, it is a known practice, in the switches mentioned, to arrange reactance networks (see, for example British Patent 822,297 published on Oct. 21, 1959, or the corresponding German Patent 1,114,228), in which the line sections to be connected over switches are terminated with condensers serving energy storers. The charge accumulated in such a condenser is transmitted over at least one series coil to a condenser terminating another line section. This measure has in itself long been known (see the book "Pulse Generator," New York and London, 1948, pp. 307 and 308, especially FIGURES 8.17 and 8.18). There it is shown how a series coil inserted in the electrical circuit brings about a complete discharge with the aid of a resonance oscillation.

The energy transmissions considered can, as is well known, also be conducted over so-called intermediate storers. Such an intermediate storer is connected alternately over a series coil with the condensers transmitting the line sections. There takes place in each case an energy exchange between the condenser of the line section involved and the intermediate storer. If the intermediate storer, likewise is a condenser, this energy exchange takes place in the form of a charge exchange, in which simultaneously the two participating condensers are on the one hand discharged and charged with the charge of the other condenser involved. These two processes are here superimposed. To avoid the occurence of disturbances, the switching elements taking part must be strictly linear, that is, their electrical characteristics, such as capacity, inductivity etc. must be independent of the particular current and of the particular voltage.

The invention now shows a way in which it is possible, in particular, to avoid the limitation that the intermediate storers must operate in a strictly linear manner. An intermediate storer then does not have to simultaneously receive energy from the condenser in each case connected with it over a coil and, in turn, to deliver energy to such condenser. If these conditions are avoided, the requirements with respect to relevant characteristic of the intermediate storer involved are reduced, so that other intermediate storers can also be used, and, will be seen, among other things, intermediate storers can be utilized without difficulty, which make possible an amplification. Also are avoided undesired and interfering frequencies which otherwise occur in a superimposition of various oscillations on switching elements that are not strictly linear. Through the invention, for all these reasons, there results an important advance in the art. It should be here noted that the line sections to be connected over the switching circuit according to the invention may also belong to other devices than to an exchange system. They also may, for example, belong to the transmission system, such as a multichannel program transmission device for ratio purposes (see German Patent 1,084,329 published June 30, 1960), wherein signals belong to the appropriate line sections.

The invention, therefore, relates to a switching circuit for impulsewise energy transmission between line sections, in which the line sections are terminated by line storers which are connected over switches, operated by sequences of control impulses, to multiplex bars. This circuit is especially suitable for the connection of line sections in time-multiplex central systems. It is characterized by the feature that for the purpose of differentiation between outgoing and incoming traffic each line section can be switched over a first switch to multiplex for outgoing traffic and over a second switch to multiplex bar, for incoming traffic. In the energy transmission path leading in each case over both multiplex bars are provided two central intermediate storers which can be switched, over central switches, to the multiplex bars, so that in each case one of the two line storers concerned is connected to one multiplex bar and simultaneously therewith the other storer is connected to the other multiplex bar. The two central switches are so actuated, with respect to the two multiplex bars that in a period of time, in each case, only energy transmissions to previously emptied storers take place, and after such energy transmissions the two line storers exchange their energy content with each other, following which the two intermediate storers are usable for the energy exchange between other line storers.

As a consequence of the above described circuit according to the invention, to one intermediate storer either energy is exclusively fed, or from it energy is exclusively sent. Advantages of the circuit thereby attainable have been stated. Also advantageous is the fact that reactances used as intermediate storers can also be cooperably utilized for parametric amplification. The intermediate storage of transmitted energy, however, can also be associated with an amplification in a different manner. Moreover, the switching circuit according to the invention has still further advantageous properties, in that all the line sections are symmetrically switchable to the two multiplex bars, whereby each line section can be connected with any other desired line section.

As the switches allocated to the intermediate storers are centrally arranged and therefore are not situated at the line sections to be connected, they can be actuated with especially high time precision, and it can therefore be achieved that the actuated or switch-through time of the transmission path involved is always safely determined by the actuating time of a central switch. This actuating time can be especially short and no especially high demands are required on the switching accuracy of the switches allocated to the line sections.

It should also be noted that the presence of two multiplex lines make it possible, in the event a breakdown through a ground connection or a voltage short renders one multiplex bar unusable, with the aid of a somewhat different control of the switches, an emergency operation can be carried out over only one of the multiplex bars.

In the drawings, wherein like reference characters indicate like or corresponding parts:

Figure 1:
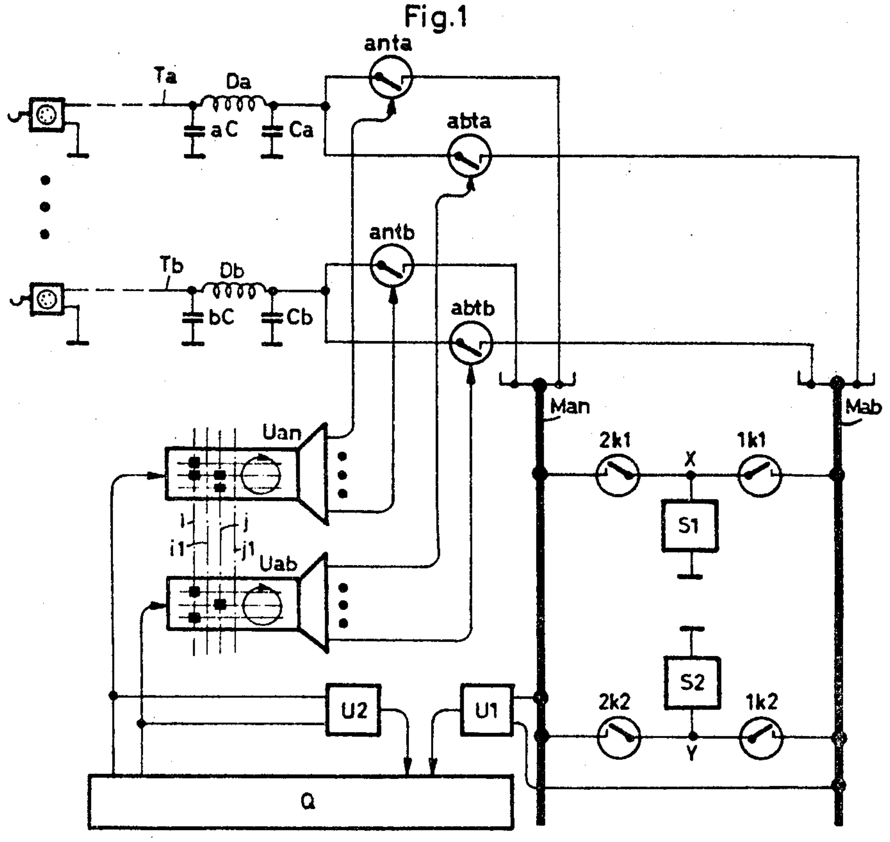
FIG. 1 illustrates an embodiment of the invention in which condensers are employed as line storers.

FIG. 1 illustrates a circuit which embodies the features to be provided according to the invention. In this circuit, to the multiplex bars M*an* and M*ab* several line storers can be connected which terminate line sections, of which the two line sections T*a* are illustrated, and to which are allocated the line storers C*a* and C*b*. The line storers C*a* is here connectable over switch *anta* to the multiplex bar M*an* and over the switch *abta* to the multiplex bar M*ab*. The line storer C*b* is connectable over the switch *antb* to the multiplex bar M*an* and over the switch *abtb* to the multiplex bar M*ab*. The multiplex bar M*ab* serves as outgoing multiplex bar for the retransmission of outgoing traffic, so that line sections to which, in incoming direction, a connection is to be built up, must be switched over their appropriate switches to this multiplex bar. A distinction between connection buildup direction is effected through the particular connection of the line section involved or of the corresponding line storer to the one or other multiplex bar.

The switches used for the switching operations may be actuated with the aid of a sequence of control impulses in a manner known per se (see, for example, French Patent 1,072,144 published on Sept. 8, 1954). If the sequence of the control impulses is periodic, then they can be designated as control pulses. Since in each case simultaneously one of the two line storers involved can be switched to one multiplex bar and the other line storer to the other multiplex bar, the same control pulse can be used for the actuation of both the switches involved.

As already mentioned, the line sections are terminated by line storers which serve, on the one hand, to collect the energy coming in during a transmission pause. On the other hand they serve the purpose of rapidly receiving the energy transmitted during an impulsewise energy transmission and then, during the following transmission pause, retransmitting it over the corresponding line section. It is recommended that condensers be employed as line storers, which are recharged in each case in the course of the energy transmission. At the end of the complete transmission the two condensers involved, serving as line storers, have exchanged their charges. Between the line storer and the corresponding line sections there are here additionally inserted low pass filters, which in the embodiment illustrated comprise chokes D*a* and D*b* as well as condensers *a*C and *b*C. If their limit frequency is smaller then the half pulse sequence frequency of the control impulses for the switches allocated to the line storers, the energy fed pulsewise to a line storer will be retransmitted in a more steady form, even in such a way that the pauses lying between the pulses are bridged.

Disposed in the energy transmission path from one line storer to another line storer there are two intermediate storers, designated S1 and S2. They are connectable by means of switches 1*k*1, 2*k*1, 1*k*2, and 2*k*2 to the multiplex bars. By appropriate actuation of these switches, the intermediate storers can be alternately connected during the switching on of the two line storers to the respective multiplex bars. The provision of two intermediate storers and two multiplex bars makes it possible, with the use of separate energy transmission paths, to simultaneously transmit energy from one line storer to intermediate storer and from the other line storer to the other intermediate storer. It is then possible to likewise transmit the energy previously stored in the intermediate storers from the first mentioned intermediate storer to the line storer and from the second mentioned intermediate storer to the first mentioned line storer. The two line storers involved have then exchanged their energy content with the other. All these energy transmissions can be developed separately from one another and in each of the circuits formed in the operation there takes place only one energy transmission. If the switches allocated to the line storers and to the intermediate storers are operated in suitable sequence, there can take place energy transmission only into previously emptied storers. In these energy transmissions any two line sections can be involved, since all the line sections are connected in the same manner to the two multiplex bars M*an* and M*ab*, as is indicated in the drawings by the representation of additional corrections thereto. In any case there takes place an intermediate storage of the energy to be transmitted, which the intermediate storage of transmitted energy may also, as previously mentioned, be associated with an amplification, as will be explained later with individual examples.

As previously stated, for a circuit which is constructed according to the invention, intermediate storers of various types are usable. Thus, the intermediate storers can be constructed as coils having inductance. Between the switching points X and Y of the circuit according to FIG. 1 there may be inserted the coils L1 and L2 illustrated in FIG. 2. With use of condensers as line storers the energy transmission to the storers involved proceeds in each case in the form of a quarter oscillation in the oscillatory circuit just connected by actuation of the switch.

Figures 6, 7, 8:
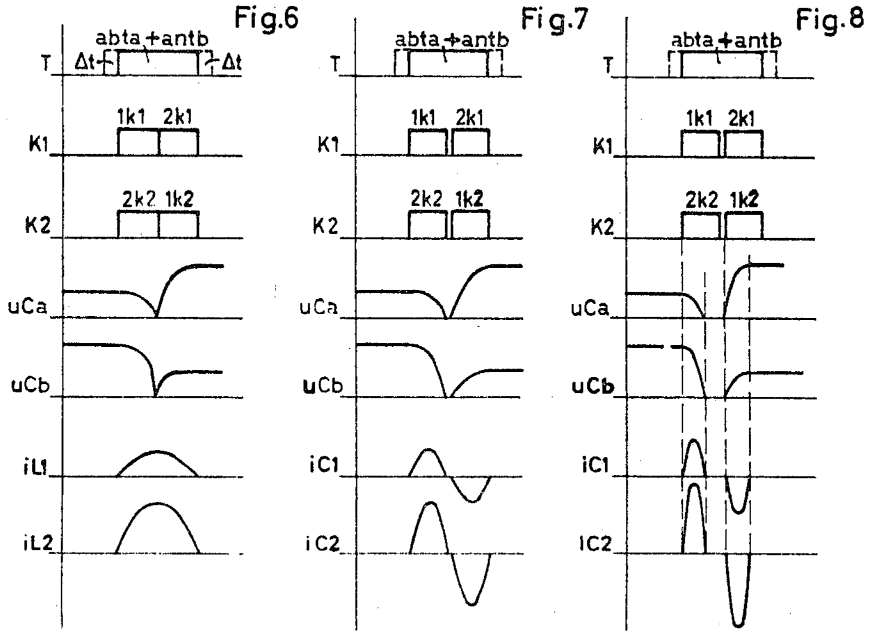
FIGS. 6, 7 and 8 illustrate examples of time diagrams for the operation of the various switches as well as for the energy transmissions taking place in each case.

The actuations of the switches concerned are represented in detail in the time diagrams of FIG. 6. In these time diagrams the time axis lies horizontal, with the point following one another toward the right. The diagram T indicates when the switches *abta* and *antb* allocated to the line sections T*a* and T*b* are operated, with the line section T*a* having outgoing traffic and the line section T*b* having incoming traffic. If the line section T*a* had incoming traffic and the line section T*b* outgoing traffic, the switches *anta* and *abtb* have to be operated, and in any case, the two switches concerned are operated simultaneously. During the operating times of switches *abta* and *antb*, first over switches 1*k*1 and 2*k*2 and then over switches 2*k*1 and 1*k*2 the coils L1 and L2 are alternately connected to the two multiplex bars M*an* and M*ab*. The actuations of these switches are shown in diagrams K1 and K2, diagram K1 indicating the coil L1 is first switched over switch 1*k*1 to the outgoing multiplex bar M*ab*, and immediately at the end of the actuation of this switch the switch 2*k*1 is actuated through which the coil L1 is connected to the incoming multiplex bar M*an*. In a similar manner, according to diagram K2, during the operating time of the switches *abta* and *antb* the coil L2 is connected over switch 2*k*2 first to the incoming multiplex bar M*an* and immediately thereafter to the outgoing multiplex bar M*ab*. At the same time, therefore, to the same multiplex bar there is connected only one of these two coils.

The operating times for the switches 1*k*1, 2*k*1, 1*k*2 and 2*k*2, which are allocated to the coils serving as intermediate storers, are at most half as long as the operating times for the switches allocated to the line sections. They may also be still shorter than is shown in diagrams K1 and K2, in which case the natural frequencies of the oscillatory circuits forming the transmission paths in question, including the condensers serving as line storers and the coils serving as intermediate storers, will be correspondingly higher. The operating time of switches 1*k*1, 2*k*1, 1*k*2 and 2*k*2 is, in this embodiment, precisely dimensioned so that in each case an energy transmission can just place in the form of a quarter oscillation. The operating times shown in diagram T for the switches allocated to the line sections may, on the other hand, without creating disturbances, vary in their length, which is indicated by the time spans $\Delta t$. On the precision of these operating times, therefore, only light demands are made. The operating times for switches 1*k*1, 2*k*1, 1*k*2 and 2*k*2, on the other hand, have to be maintained relatively precisely, but as these switches are centrally located, this can also be achieved, and for the same reason it is possible to achieve especially short operating times.

With the aid of the additional diagrams *u*C*a*, *u*C*b*, *i*L1 and iL2 relating to FIG. 1, the course of the voltages to the condensers C*a* and C*b* serving as line storers is represented, as well as the course of the currents in the coils L1 and L2 serving as intermediate storers. First, the coil L1 is connected over switch 1*k*1, to the outgoing multiplex bar M*ab* and over the switch *abta* with the condenser C*a*. This discharges (see diagram *u*C*a*), whereby the current in coil L1 rises during a quarter oscillation up to a maximum, as illustrated in diagram *i*L1. At this instant the energy previously stored in condenser C*a* is transferred to the coil L1, where it exists in the form of magnetic energy. At the same instant the switch 1*k*1 is opened and the switch 2*k*1 is closed. With the current then flowing onward without interruption there follows directly upon the previous energy transmission from the condenser C*a* to the coil L1, the energy transmission from such coil to the condenser C*b*, the other line storer. It is now connected over switch 2*k*1 over incoming multiplex bar M*an* and over switch *antb* with coil L1. The current in coil L1 diminishes and the voltage at condenser C*b* rises as illustrated in diagrams *i*L1 and *u*C*b*. Prior thereto the condenser C*b* had been discharged with the aid of coil L2, resulting from actuation of switch 2*k*2, whereby the coil L2 was connected with condenser C*b* over the likewise actuated switch *antb* and the incoming multiplex bar M*an*, thereby permitting the condenser to discharge. In the process, in coil L2, the current likewise rose during a quarter oscillation up to a maximum, as illustrated in diagram *i*L2. Immediately after the end of actuation of switch 2*k*2, switch 1*k*2 was actuated, whereby the coil L2, over the outgoing multiplex bar M*ab* and the switch *abta*, previously closed, was connected with condenser C*a*. The current in coil L2 diminished, while the condenser C*a* was charged, as illustrated in diagrams *i*L2 and *u*C*a*. After the end of the operations of the respective switches, the two condensers C*a* and C*b* have exchanged their charges and, correspondingly, the voltages thereon have been exchanged and the coils L1 and L2 are then again without current. While previously the lower voltage lay on condenser C*a* and the higher voltage lay on condenser C*b*, now the lower voltage lies on condenser C*b* and the higher voltage lies on condenser C*a*.

Figure 2:
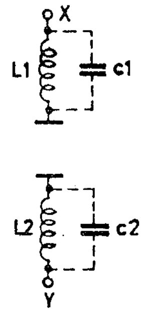
FIGS. 2, 3 and 4 illustrate various types of intermediate storers.

There are additionally recommended special measures in order to assure that, in any case, no interruption of the current can occur in one of the coils L1 and L2 between the successive energy transmission therefrom. For this purpose, for example, there can be connected in parallel with the coil serving as intermediate storer, an auxiliary condenser, which, if need be is briefly transversed by a current. Such auxiliary condensers are indicated in FIG. 2 in broken lines and designated as *c*1 and *c*2. It may be desirable that these auxiliary condensers be periodically short circuited at suitable intervals of time, in order to eliminate any charges. The coils L1 and L2 can also be designed for so-called parametric amplification. How a parametric amplification can be carried out will be subsequently explained in detail.

First, some other advantageous measures will be described which, in the use of condensers as line storers and of other intermediate storers than the previously described coils, are suitable for improving the impulsewise transmission of energy. Of these, first may be mentioned, the measure of providing coils having inductivity, which in each case are disposed in the energy transmission paths switched through by the actuation of the switches, and which, by their inductivity, bring about an energy transmission to the storer in question in the form of a partial vibration. These coils may, for example, be centrally located, for which there are various possibilities. Thus, they may lie directly in series with the intermediate storers, as is shown in the circuit according to FIG. 3 where the coils 1L and 2L lie in series to the condensers C1 and C2 serving as intermediate storers. It is also possible, however, for a part of each centrally located coil to be inserted, in each case, in a multiplex bar. Thus, for example, in the circuit according to FIG. 5 the multiplex bars M*an* and M*ab* may have coils L*an* and L*ab*, there illustrated in broken lines.

Figure 5:
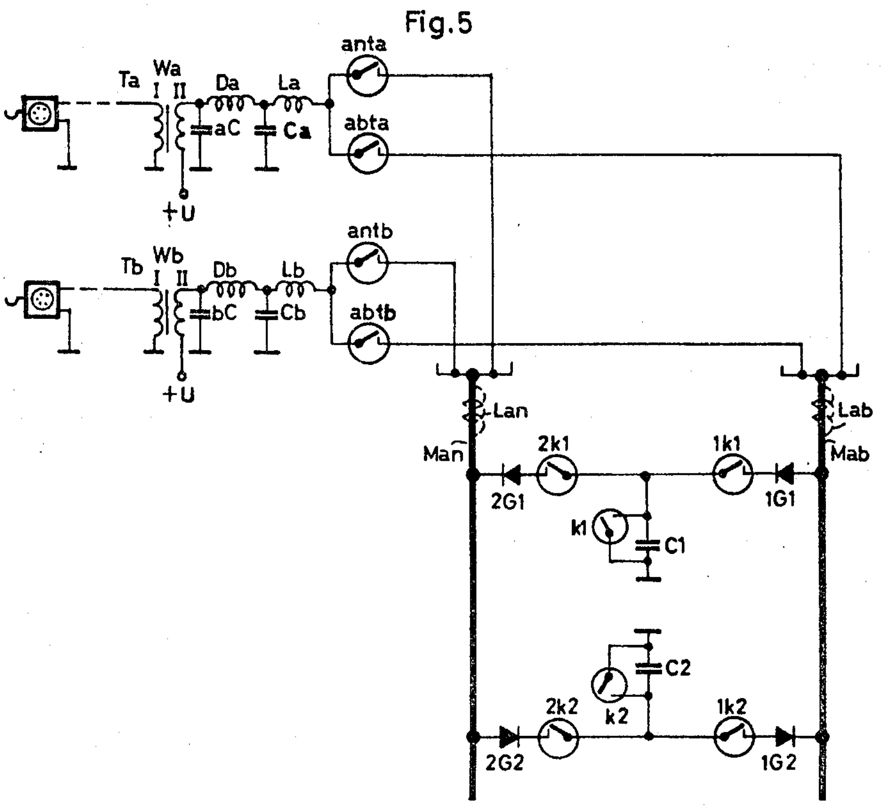
FIG. 5 represents an embodiment in which, by special measures, an undesired feed back oscillation of the transmitted energy.

In place of centrally located coils decentrally located coils also can be provided, which lie then between the line storers and multiplex bars belonging to the line sections. Thus, in the circuit according to FIG. 5, between the line storers C*a* and C*b* and the multiplex bars M*an* and M*ab* there are inserted the decentralized coils L*a* and L*b*. If the above-described coils are present an energy transmission takes place in every case over at least one of these coils, whereby in consequence of the effectiveness of the inductance, there is advantageously achieved, among other things, a loss-free limitation of currents there occurring. The effective inductivity may also be distributed over a decentralized coil and at least one central coil. In this case, for example, all the coils represented in FIG. 5 are inserted in the illustrated circuit.

Expediently, the central coils and/or the decentralized coils may be constructed as parametric amplifiers. The energy transmission can then, immediately be amplified whereby the losses occurring in the switching and other losses can be compensated. As is known, a coil undergoing inductivity may bring about an amplification of the energy transmitted over it (see, for example, Fernmelde-Praxis vol. 37, No. 6, Mar. 1, 1960, pp. 201 to 228, (entitled "Parametric Amplifier") especially 227; Bulletin des Schweiz. Elektrotechn. Vereins 1960, pp. 1046 to 1053; Proceedings of the IRE, July 1965, pp. 904 to 913

(entitled "Parametric Circuits at Low Frequencies Using Ferrites and Thin Magnetic Films") and May 1958, pp. 850 to 866). If desirable, the coil may for this purpose be subdivided into partial coils with several windings. If it is a matter of a centrally located coil which does not simultaneously serve as an intermediate storer, it is essentially advantageous that the amplification of this coil acting as a parametric amplifier works out quadrically for the energy transmission between the two separated line storers. The energy transmission always take place, as already stated, in two stages over an intermediate storer. In each case it then passes over the central coil involved, in each of which operations an amplification is achievable. The decentralized coils also may be executed as parametric amplifiers. Since the energy transmission here takes place from one line storer to another line storer over the two coils allocated to the line storers involved, the resulting amplification is determined by the product of the two corresponding amplification factors. It should further be noted that the operating time of the switches may be adapted to a change of the natural frequency of the existing oscillatory circuits because of parametric amplification.

As already stated, for a circuit which is built up according to the invention, intermediate storers of various types are usable. Thus, the intermediate storers may also be constructed as condensers. Between the switching points X and Y in the circuit illustrated in FIG. 1, the condensers shown in FIG. 3 may be inserted. In series with these condensers are disposed additionally the coils 1L and 2L whose inductance is effective in the path of energy transmission. From and to condensers serving as line storers there then takes place the energy transmission, in the form of a half oscillation. Moreover, the condensers serving as intermediate storers also can be executed as parametric amplifiers. For a parametric amplification in each case the capacity of the condenser involved is reduced before its discharge, and the energy fed in for this purpose serves for the raising of its energy content. Condensers suitable for this purpose are already known (see, for example, Fernmelde-Praxis vol. 37, No. 6, Mar. 15, 1960, p. 227). Also, such a condenser can be subdivided into several partial condensers. With the aid of intermediate storers constructed as parametric amplifiers, losses in the circuit as well as other transmission losses can likewise be compensated for.

It may also be pointed out that it is frequently expedient to short-circuit the condensers serving as intermediate storers, in each case, before their charging takes place from a line storer, by means of additional short-circuit switches. Such short-circuit switches are provided in the circuit according to FIG. 5 and are there designated as *k*1 and *k*2. These switches prevent an energy residual, resulting from faulty operation during a previous energy transmission, which might disturb or falsify the subsequent energy transmission. It is recommended for similar reasons in these circuit examples and also in the other circuit examples here treated that there also be provided, at suitable times, a periodic grounding of the multiplex bars.

The intermediate storers also may, for example, be formed of ferromagnetic core storers, and must then consist of a material with remanence, having an approximately linear working characteristic line for the magnetic properties within the working range to be utilized for the energy storage.

Figure 4:
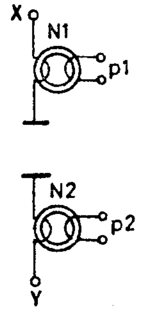

In a storage operation there then takes place in the core storer involved a magnetization proceeding from a previously established magnetic initial state, which remains preserved until the storage discharge. This magnetization corresponds in each case to the energy to be transmitted. In the storage releases there takes place an energy transmission from the core storer serving as intermediate storer to a line storer, such energy transmission taking place with the aid of a reading pulse which restores the core storer concerned to its initial magnetic state. With use of such core storers in the circuit illustrated in FIG. 1 there are to be inserted between the switching points X and Y the core storers K1 and K2 illustrated in FIG 4. The reading pulses are there to be fed to the windings connected to the terminal pairs K1 and K2. It may also be expedient to feed to the core stores serving as intermediate storers special resetting impulses before any storage effected therein. Such reset pulses may also be suplied over the terminal pairs *p*1 and *p*2, and the core storers are in each case thereby restored exactly to their estabilshed initial magnetic state.

If core storers are used as intermediate storers, then it is possible that the inductance present can also be utilized for the purpose of bringing about, within a short time, the complete discharge of condensers serving as line storers. There then may be inserted into the transmission paths coils with smaller inductance than other wise, or possible none at all.

It should also be noted that with use of condensers or core storers or other possible constructional elements as intermediate storers, the operating times for the switches allocated to them, are to be made, at most, half as long as the operating times for the switches allocated to the line sections.

Figure 3:
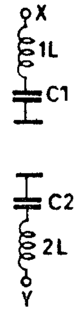

In the following there is described the manner of operation of the circuit shown in FIG. 1 when, as intermediate storers, there are provided the condensers C1 and C2 shown in FIG. 3 with which the coils 1L and 2L are in series. The energy transmissions to the storer involved, here takes place into the resonant circuits just switched through by the actuation switches in the form of a half oscillation. These energy transmissions and the sequence of operations of the switches involved are represented in detail in the time diagrams of FIG. 7. In the diagrams designated by T, K1 and K2 the operation of the involved switches is illustrated. These three diagrams generally agree with the corresponding ones of FIG. 6. Correspondingly the operating conditions for the switches also are generally the same in both cases. The only difference lies in the fact that here the actuation of the switches 1*k*1 and 2*k*1 and also of switches 2*k*2 and 1*k*1 need not take place in direct succession so that a pause may exist between them, since the energy stored in the form of a charge in a condenser serving as an intermediate storer does not have to be immediately retransmitted. Such a pause is illustrated in diagrams K1 and K2.

During the actuating times of switches 1*k*1, 2*k*1, 1*k*2 and 2*k*2 there takes place, as previously mentioned, energy transmissions in the form of a half wave oscillation. The corresponding course of the voltages at the condensers C*a* and C*b*, as well as of the charging and discharging currents for the condensers C1 and C2, serving as intermediate storers, is represented in the diagrams *u*C*a*, *u*C*b*, *i*C1 and *i*C2 of FIG. 7. The diagram *u*C*a* illustrates the voltage course at the condenser C*a*. It is apparent that the voltage initially thereat disappears with the actuation of switch 1*k*1. Simultaneously, according to diagram *i*C1, the condenser C1 is charged by a current halfwave. During the simultaneous operation of switch 2*k*2 the voltage lying on condenser C*b* disappears as apparent form diagram *u*C*b*. Simultaneously, according to diagram *i*C2 the condenser C2 is charged by a current halfwave. There then is simultaneously effected the actuation of said switches 2*k*1 and 1*k*2. As a result of the actuation of switch 2*k*1, the condenser C1 again discharges, see diagram *i*C1, and the condenser C*b* is charged, as is represented in diagram *u*C*b*, and as a result of the actuation of switch 1*k*2, a corresponding action takes place for condensers C2 and C*a*, as is apparent from diagrams *i*C2 and *u*C*a*. As the voltages lying on condensers C*a* and C*b* at the start of the energy transmissions were different, the condenser C*a* having the lower and the condenser C*b* the higher voltage, after the conclusion of the energy transmissions under consideration, the condenser Ca will have the higher voltage and the condenser Cb the lower voltage. The charges of the condensers have, therefore, beam exchanged.

As heretofore throughly described, ferromagnetic core storers can also be employed as intermediate storers and in this case for the storage released from the core storers there are additionaly needed reading pulses. The course of the currents and voltages here occuring has, of course, a somewhat different form than in the use of condensers, but in principle is very similar.

As already mentioned in connection with the use of condensers as line storers and in energy transmissions in the form of half oscillations or particularly quarter oscillations, the operating times of the switches allocated to the intermediate storers have to be adapted to the duration of the partial oscillations taking place in the energy transmissions. If the operating time is too short, the energy transmission will be incomplete, since a part of the energy to be transmitted will remain in the storer to be emptied. If the operating time is too long, at least part of the already transmitted energy will be fed back to the emptied storer. The switch involved must open with certainty at the right time, to prevent further energy transmissions in which at least a part of the energy just previously transmitted is received at wrong locations, especially at other line sections with switches that have just been operated. There would thus occur possible cross talk between different connection paths.

The above defined conditions for the operation of the switches concerned can be maintained with less exactness, without disadvantage, by the adoption of certain additional measures which are not obvious. These measures relate also to a switching circuit in which condensers are utilized as line storers. If in this circuit energy transmissions are to be made merely by means of more or less large pulses exclusively of one and the same polarity, then for the intended purpose rectifiers may be inserted in the transmission paths which are so poled that they are traversed only by the current pulses in a pass direction operative to effect the intended energy transmissions. By the utilization of this measure, in many cases the length of the operating times can be dimensioned with relatively great tolerance without any danger that a return transmission will occur after the intended energy transmission. This is now prevented by the rectifier involved poled in blocking direction. If condensers are employed as intermediate storers and coils are inserted in the transmission paths, the second half oscillation, starting after the first half oscillation during which the condenser concerned was just charged, is suppressed. It therefore cannot be immediately discharged in an undesired manner. Also an imprecise opening of the switch involved is then less harmful than otherwise, since here, too, a discharge of the condenser just charged is suppressed. Through the insertion of rectifiers, therefore, the possibility of cross-talk is also reduced. The insertion of rectifiers is also of advantage with the use of other intermediate storers, if there is a danger of a transmission of the energy just transmitted. If, for example, as intermediate storers coils having inductance are utilized, after the release from storage of the energy content of the coil involved to a condenser serving as line storer during a quarter oscillation, the inserted rectifier will prevent an undesired retransformer of the energy stored in the condenser.

The above described insertion of rectifiers into the transmission paths involved can be carried out in various ways. Thus, for example, each intermediate storer can be connectable to each multiplex bar over respective switches, which are disposed in series with differently poled rectifiers, so that by means of these switches the rectifier suited for the intended energy transmission is inserted into the transmission path. This measure, among others, is provided in the circuit shown in FIG. 5. As therein illustrated, to each of the switches 1k1, 2k1, 1k2 and 2k2 there is connected in series a rectifier, which rectifiers are designated as 1G1, 2G1, 1G2 and 2G2. If for the connection of the intermediate storers such switches are used as allow an energy transmission only in the intended direction and, accordingly, simultaneously include the rectifiers, special rectifiers are superfluous.

It has been assumed that for the energy transmissions impulses of the same polarity exclusively occur. If this is not inherently the case, this can be achieved by special measures, even if over the particular connection established alternating voltages and alternating currents of differing frequency are to be transmitted. Such measure proceeds from a circuit in which low pass filters are connected in series, at the input with the line storers. These low pass filters are connected over transformers with the corresponding line sections. The alternating voltages to be transmitted are fed to the primary windings of these transformers. At the secondary windings of these transformers there is applied a biasing voltage which corresponds at least to the amplitude of the highest alternating voltage to be transmitted and has the same polarity as the charges to be received in the condensers serving as line storers.

Thus measure is also provided in the circuit shown in FIG. 5 wherein there are inserted in the circuit, with the condensers Ca and Cb serving as line storers, respective low pass filters which comprise the chokes Da and Db as well as the condensers aC and bC. To the line section Ta with the line storer Ca there is allocated the transformer Wa, to the secondary winding II of which is applied a positive biasing voltage +U, with the alternating voltages and currents to be transmited being supplied to its primary winding I.

The operation of the circuit shown in FIG. 5 will now be explained in detail in connection with the diagrams illustrated in FIG. 8. As intermediate storers condensers are herewith used, the energy transmissions taking place, in each case, in the form of half oscillations, since in the transmission paths, as heretofore described, coils are also inserted. The operation of the switches allocated to the line storers and the intermediate storers is shown in diagrams T, K1 and K2, these diagrams corresponding with those similarly designated in FIG. 7. The operation of the switches therefore takes place exactly as in the previously described embodiment.

Due to the effect of the initial bias U applied at the secondary windings II of the transformers Wa and Wb, there can occur only positive voltages at the condensers Ca and Cb, serving as line storers, and therefore they can be charged only with positive polarity. Accordingly during the first simultaneous operation of switches 1k1 and 2k2 in the charging of the condensers C1 and C2, serving as intermediate storers, the charging current will always flow through the rectifiers 1G1 and 2G2 in pass direction. During the subsequent simultaneous operation of switches 2k1 and 1k2 the condensers C1 and C2 will be discharged with the rectifiers 2G1 and 1G2 each being traversed by the discharge currents in pass direction. The inserted rectifiers, therefore, are all correctly poled.

As previously indicated, with use of the rectifiers inserted in the transmission paths in the above-decribed manner, it can be additionally provided that the energy transmission from and to the storers, which always beings with the switching through of the transmision path involved is completed before the transmission path is interrupted by opening of a switch disposed therein. With use of condensers as line storers and as intermediate storers, as well as the insertion of coils having inductance in the transmission path, the particular transmission path must, for this purpose, form an oscillatory circuit which is so tuned that the length of the halfwave of its natural oscillation is shorter than the shortest time span occurring while the transmission path involved is switched through. It should be here pointed out that a great tolerance is allowable for the tuning of the oscillatory circuit involved. Expediently, the duration of the switching-through of a transmission path is always determined by operation of that switch allocated to an intermediate storer over which the transmission path involved extends.

An example of the course of the voltages occurring in the condensers C*a* and C*b*, serving as line storers, and of the currents occurring in condensers C1 and C2, serving as intermediate storers, is illustrated in the previously mentioned FIG. 8, specifically the diagrams *u*C*a*, *u*C*b*, *i*C1 and *i*C2, which diagrams correspond to the like-designated diagrams in FIG. 7. A comparison shows that in distinction to the latter diagrams, here the voltages and current changes are in each case already terminated during the half operating time of the switch concerned allocated to an intermediate storer, namely the switches 1*k*1, 1*k*2, 2*k*1 and 2*k*2. These voltages and current changes represent in each case the discharge of the one and the charging of the other of the two condensers involved, with reverse discharges being suppressed by the rectifiers inserted in the transmission paths permitting great tolerances for the operating time of the centrally located switches. Changes in the tuning of the oscillatory circuits in consequence of capacitance changes in parametric amplification, which, for example, takes place with the aid of a condenser serving as an intermediate storer, have no direct influence on the necessary operating times for the switches concerned. The intermediate storer, like the condensers serving as parametric amplifiers, are in each case advantageously fed only with voltages of one and the same polarity. For the short-circuiting of the condensers C1 and C2 serving as intermediate storers, switches *k*1 and *k*2 are also provided in the circuit according to FIG. 5. Expediently, they are always operated simultaneously, before energy transmissions are effected between two line storers. The duration of their operation can be shorter than that of the operation of the other centrally located switches.

Figure 9:
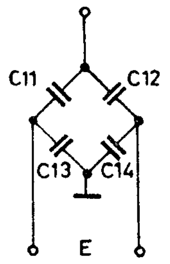
FIGS. 9 and 10 illustrate examples of utilization of condensers and coils as parametric amplifiers.

FIG. 9 illustrates how, for example, in an expedient manner a condenser consisting of several partial condensers and serving as a parametric amplifier may be constructed. The condensers there illustrated consists of four partial condensers C11, C12, C13 and C14, which are arranged in the form of a bridge circuit. The one pair of oppositely disposed connecting points of the partial condensers serve as connections for the condenser, and over the two other oppositely disposed connections, designated by E, a voltage is fed which brings about a change in the capacitance of the partial condensers. As condensers which can be controlled by such a voltage there are available, for example, so-called varactors, that is, semi-conductor diodes, which are operated in the blocking range. The control voltage fed at the terminals E is divided over the interposed bridge branches, with corresponding dimensioning of the partial condensers being such that between the other two oppositely located connections no voltage difference is created, and thus will have no influencing effect on the rest condition of the circuit, into which this variable condenser is inserted.

Figure 10:
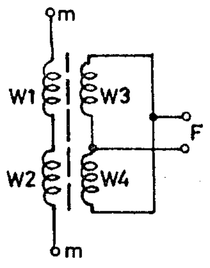

FIG. 10 illustrates how, in an expedient manner, a coil having 2 x 2 windings W1, W2 and W3, W4 which are magnetically coupled. To the windings W3 and W4 there is applied a control voltage over the terminals F, which control voltage creates currents which flow in opposite directions through the two windings involved. Any voltages which might be induced in the two windings W1 and W2 by the applied control voltages thus cancel each other out, and the control voltage therefore, can in no case have any effect between the connections *m*. The windings W1 and W2 disposed between the two connections *m* are thus inserted in the energy transmission path involved.

Two line sections connected pulsewise over intermediate storers in a circuit which is built up according to the invention have two-way operation. If a parametric amplification is provided in a manner here described, the two connected line sections immediately represent a two-way amplifier. As previously stated, this arrangement can also be used for other purposes.

It should be further noted that because of the good controllability of a parametric amplifier the amplification can be made dependent on the extent of the attenuation in the line sections to be connected. If rectifiers are inserted in the transmission paths, changes in the natural frequencies of the oscillatory circuits occurring in changes of the amplification are not noticeably troublesome. A change of the amplification is of particular interest when the line sections lead to subscriber stations and is therefore a matter of subscriber lines which frequently have different attenuations. It is then possible to regulate the audio level of the conversations conducted over the connections involved in each case to a uniform value for all subscribers. The fact that line sections are subscriber lines is indicated by the subscriber stations illustrated in schematic form in FIGS. 1 and 5.

In every example heretofore considered, the connections were extended over the same two multiplex bars. In exchange systems which have a relatively large number of subscribers, frequently several pairs of multiplex bars are provided which can be connected together with switches over coupling networks, and to each pair of multiplex bars a special group of subscribers is connectable. (See, for example, British Patent 814,183 published July 3, 1959, FIG. 3 Prov. Spec.) Even if such coupling networks are provided it may be expedient to make energy transmissions between subscribers connected to different pairs of multiplex bars. Here, expediently, two central intermediate storers belonging to the two pairs of multiplex bars can be utilized. The especially great tolerances for the operation of the involved switches and for the tuning of the oscillatory circuits formed in each of the particular embodiments of a switching circuit according to the invention are especially advantageous in this case, since with the presence of several pairs of multiplex bars close tolerances are more difficult to maintain.

In the present description of the circuit according to the invention and its further developments no detailed descriptions have been given of the construction of the switches and control devices used, which are necessary to control these switches. Such switches and the appropriate devices are individually known (see, French Patent 1,072,144 published on Sept. 8, 1954, U.S. Patent 2,936,337 issued May 10, 1960).

As previously stated, the switching arrangement according to the invention also has the advantage that an emergency operation can be carried out over one multiplex bar. Such an emergency operation may be carried out, in the following manner:

For the connection of line sections, connectable to the same two multiplex bars, only such energy transmissions are effected whose transmission paths lead merely over one of the two multiplex bars. Of the switches allocated to the line sections, only those over which these line sections are connectable to the now exclusively used multiplex bar, will receive control impulses. The additional advantage results that certain disturbances, which may occur in the devices providing these control pulses, can be rendered ineffective. The control impulses for the switches allocated to the line sections are frequently supplied with the aid of a cyclic storer for addresses of line sections with connection build-up in outgoing direction and with the aid of a cyclic storer for addresses of line sections with connection build-up in incoming direction. Such cyclic storers are also illustrated in the circuit of FIG. 1, and are designated U*ab* and U*an*. If only one multiplex bar is being used, the control pulses for the control of the switches allocated to the line sections are to be supplied merely by that cyclic storer in which are cycled only addresses for line sections with connection-making direction (outgoing-incoming) which corresponds to the now exclusively used multiplex bar (outgoing multiplex bar-incoming multiplex bar). For example, if only the outgoing multiplex bar M*ab* is used, only the cyclic storer U*ab* is needed, which normally contains only addresses of line sections with, in each case, connection build-up in outgoing direction or with outgoing traffic. It must, however, in this case receive the addresses of all the line sections taking part in the connections now existing. Thus, in the meantime, if the other cyclic storer has a breakdown, the connections are not affected. Conversely viewed this means that in the case of any trouble of one of the two normally used cyclic storers it is now still possible to carry out an emergency operation over that multiplex bar which corresponds to that direction of connection build-up which the line sections have for which the cyclic storer, not out of order, normally supplies addresses. If, for example, the cyclic storer U*an* is out of order, then all the energy transmissions are to be conducted over the outgoing multiplex bar M*ab*. The switches needed for this allocated to the line sections, are to be supplied with control pulses from the undamaged cyclic storer U*ab*. It should also be noted that breakdowns of other devices may be rendered ineffective by use of only one multiplex bar.

In order to bring out connections between line sections over only one multiplex bar it is possible, for example, for the energy transmission necessary for this to be developed in the following manner: They are, in this case, conducted over the two cooperable intermediate storers connectable to these multiplex bars. For the energy transmissions there is in each case only the first of the two cooperable line storers to be connected thereupon only the second and then, again, only the first of these two line storers to the multiplex bar. In the circuit according to FIG. 1, therefore, first only the line storer C*a*, then line storer C*b* and then, again, the line storer C*a* would have to be switched onto the multiplex bar M*ab*. During the connection of the second line storer C*b* there takes place first, upon an additional temporary connection of the second intermediate storer S2, an energy transmission thereto, whereupon alternately therewith, the first intermediate storer S1 is additionally temporarily connected, from which there takes place an energy transmission to the line storer C*b*. During the repeated switching on of the first line storer C*a* upon the additional temporary connection of the second intermediate S1, there takes place therefrom an energy transmission to the first line storer C*a*. The two line storers C*a* and C*b* have now interchanged their energy content. After this the two intermediate storers S1 and S2 utilized are available for energy exchange between other line storers. Thus, for several connections the necessary energy transmissions can be executed over the mutliplex bar and the intermediate storers until, in accordance with the scanning frequency assigned for the same connection, energy transmissions will be repeated for the first-effected connection. Afterwards there again follow energy transmissions for the second-effective connection etc.

Also for all these energy transmissions line storers of various types, as previously described, can be used. It is also possible to provide the other features of the switching arrangement according to the invention, heretofore described, in energy transmissions over only one multiplex bar.

Figure 11:
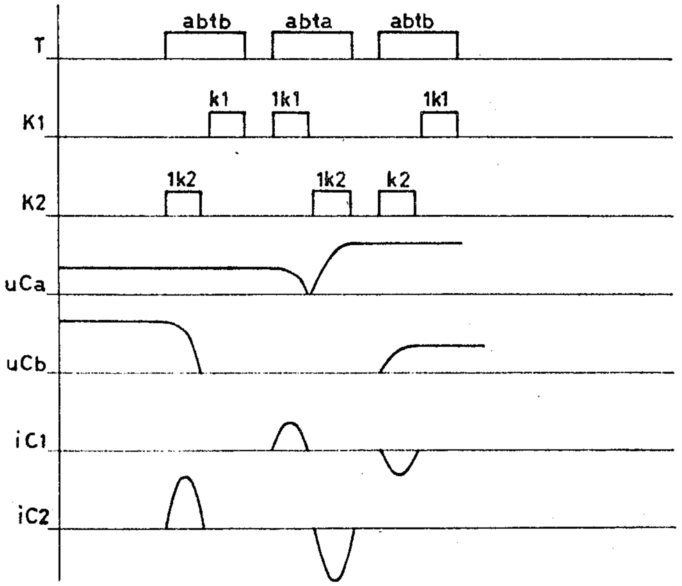
FIG. 11 illustrates an example of the operation of the switches and of the energy transmissions there taking place if they are conducted over only one of the two multiplex bars.

The sequence of the energy transmissions in each case belonging to a connection, which extend over only one multiplex bar is illustrated in detail in FIG. 11, where it is also shown how the switches allocated to the line sections to be connected, and the switches allocated to the intermediate storers are to be operated. The operation of the switches *abta* and *abtb* allocated to the line sections T*a* and T*b* is illustrated in the diagram T, the switch *abtb* being operated twice and the switch *abta* being operated once. First the switch *abtb* is operated. The switch *abta* could be operated as the first one, in which case, it would be operated twice. While the switch *abtb* is operated, the swtch 1*k*2 belonging to the intermediate storer S2 is temporarily operated, as illustrated in the diagram K2. While the switch *abta* is operated, alternately the switches 1*k*1 and 1*k*2 belonging to the intermediate storers S1 and S2 are operated, as illustrated in diagrams K2 and K1. Afterwards the switch *abtb* is operated for the second time, during which time the switch 1*k*1 is also operated. The operating times for the switches 1*k*1 and 1*k*2 allocated to the intermediate storers also are, for example, at most half as long as the operating times of the switches *abta* and *abtb* allocated in the line sections. If, for example, condensers are utilized as intermediate storers, and into the transmission path concerned there is inserted in each case a coil with inductance, here, too, the energy transmission always takes place in the form of a half oscillation.

The short-circuiting, heretofore mentioned of condensers serving as intermediate storers, here takes place expediently during the connection of the condenser C*a* serving as first line storer. For such short circuiting there again may be employed switches *k*1 and *k*2, the operating times of which are included in the diagram K1 and K2. Such operating times fit well into the other operating times if they are, at most, half as long as the operating times for the switches in the line storers. They also may be still shorter, since an accommodation to a half oscillation is here unnecessary. It is then possible in each case to correspondingly shorten the operating time of the switch *abtb*.

With the aid of diagrams *u*C*a*, *u*C*b*, *i*C1 and *i*C2 of FIG. 11, there is additionally shown the course of the voltages in condensers serving as line storers, as well as the course of the currents in condensers C*a*, C*b*, C1 and C2, serving as intermediate storers. Diagram *u*C*a* shows the voltage course at the condenser C*a*, from which it is apparent that the voltage initially existing there disappears during the operation of switch 1*k*2, while simultaneously, according to the diagram *i*C2, the condenser C2 is charged by a current. During the operating time of switch 1*k*1, as illustrated in diagram *u*C*a* in the condenser C*a* is discharged and simultaneously, according to diagram *i*C1, the condenser *c*1 is charged with current. During the following second operating time for the switch 1*k*2 the condenser C2 is discharged, as diagram *i*C2 illustrates, while condenser C*a* is charged in the operation in accordance with diagram *u*C*a*. During the second operating time of switch 1*k*1, the condenser C1 is dicharged, as illustrated in diagram *i*C1, while the condenser C*b* is charged in the operatiion in accordance with diagram *u*C*b*. The voltages lying on the condensers C*a* and C*b* at the beginning of the energy transmission were different, the condenser C*a* having the lower and the condenser C*b* the higher voltage, while upon the conclusion of the energy transmissions involved, the condenser C*a* has the higher and the condenser C*b* the lower voltage. Thus, the voltages and the charges of the condensers serving as line storers are exchanged in the course of the energy transmissions.

There remains to be presented only an explanation as to how a switchover can be effected through which the development of energy transmissions whose transmission paths normally lead over both multiplex bars is so changed that the transmission paths extend over only one multiplex bar. Such a switch-over is to be provided, for example, when a multiplex bar is rendered inoperative by a ground or voltage short. Following the switch-over only the other multiplex bar is used. In the circuit illustrated in FIG. 1, the multiplex bars M*ab* and M*an* are still connected with the monitoring device U1, which in case of trouble in one of the two multiplex bars, delivers a signal for such a switch-over. The monitoring device may be constructed, for example, with switches responsive to predetermined threshold values, which are actuated when the delivered voltages steadily exceed a certain magnitude. The signal delivered by the monitoring device passes to the control device Q belonging to the exchange system, which thereupon goes into operation to effect the desired switch over. There is also provided a monitoring device U2, which is connected with lines which lead from the control device Q to the cyclic storers U$ab$ and U$an$. Over these lines, in the course of exchange operations, the digits to be stored, which belong to addresses of line sections, as well as termination signals for digits and addresses are transmitted. If, for example, such transmissions extraordinarily accumulate or cease altogether, this is an indication that there is a breakdown, which may also directly concern a cyclic storer or a multiplex bar. The monitoring device U2 contains counters which determine such accumulation or the absence of the operations involved. In such event, from the monitoring device U2 a signal is then delivered to the control device Q, as a result of which, this device at least temporarily so changes the development of the energy transmissions that the transmission paths will now extend over only the one multiplex bar, and, in the operation, only one cyclic storer will be employed. If the deviation with respect to the occurrence of number (figure) storings or extinction processes then disappears, then the breakdown is rendered ineffective. If the deviation does not disappear, the other multiplex bar and only the other cyclic storer can be utilized, which should enable continued operation. The monitoring device U2 can also monitor the appearance of other suitable operations. In general, there may be considered in this conenction operations which, in comparison to other operations such as the operation of switches, relatively seldom occur.

There still remains to be discussed only how the traffic in the exchange system is influenced by the use of only one multiplex bar for the energy transmission instead of two. In this connection there are considered diagrams T in FIGS. 6 to 8 and 11. FIGS. 6 to 8 concern the development of the energy transmission over two multiplex bars, while FIG. 11, on the other hand, concerns the transmission development over only one multiplex bar. As will be apparent from a comparison of the diagrams T in FIGS. 6 to 8 with the diagram T in FIG 11, and assuming conditions to otherwise be the same for the operation of the switches allocated to the line sections in a charge exchange between the condensers serving as line storers with use of only one multiplex bar, an appreciably longer total time is now required, since here the switches involved disperse in the line sections have to be operated successively. There must, therefore, for the same connection, now be stored in the same cyclic storer more than one address of such switches. Normally, one address suffices, namely only that of the line section with outgoing or that of the line section with incoming traffic. Since here a connection requires more storage space than otherwise, fewer connections can be maintained simultaneously. The switch-over through which the development of the energy transmissions is altered in such a way that only one multiplex bar is required thus has as a consequence, a limitation of the traffic.

This may, under some circumstances, lead to the result that a few of the connections which then happen to exist must be separated, and it is, of course, advantageous if in so doing it can be avoided that especially important connections, or connections which for reasons of communications technology are to be given especially priority, are broken. In order to achieve this result, preferred connections may be provided. The addresses of the line sections belonging to these connections are, for this purpose, stored in the cyclic storers at storage places in the proximity of which other storage places are kept free, onto which free places, in development of the energy transmissions over only one multiplex bar, the addresses of the line sections in each case connected with them are transmissible. If a switch-over is then made, because, for example, a multiplex bar is damaged, in the cyclic storer still remaining in use, the addresses belonging to priority connections are restored from the other cyclic storer. The preferred connections, therefore, despite the switch-over, continue to be maintained. This measure is indicated, too, in the circuit shown in FIG. 1 wherein the cyclic storers, cyclic circuits are indicated in which address on storage places designated with $i$, $i1$, $j$ and $j1$ are circulated. Thus on the storage places $j$ there can circulate in the two cyclic storers the addresses which belong to a preferred connection. They are disposed, in the development of the energy transmissions over two multiplex bars, in both cyclic storers. In case of a switch-over, as the result of breakdown of the multiplex bar M$an$, the address situated on the storage place $j$, is to be restored from the cyclic storer U$an$ into the cyclic storer U$ab$, for which purpose the storage place $j1$ had been kept free. It can, moreover, also be transmitted to the storage place $i1$, if it is also needed there. It should be pointed out that in case of shortened operation of the switches $k1$ and $k2$, see diagrams K1 and K2 in FIG. 11, the transmitted address, in each case, require less space than the untransmitted addresses. Consequently, it may be expedient to maintain storage places free only as long as such storage spaces, because of relatively light traffic, are not as yet needed.

The measure of giving priority to certain connections is not obvious, and it can also be used in corresponding switchovers in other time multiplex exchange systems with two multiplex bars. It is especially expedient to treat distant connections as preferred connections. Further it is also recommended that other connections which extend to other stations be treated as preferred. It can also be provided that connections from or to certain subscribers be treated as preferred connections. The latter is especially recommended in the case of branch installations wherein frequently subscriber stations are involved whose connectionas are to be regarded as especially important.

Changes may be made within the scope and spirit of the appended claims which define what is believed to be new and desired to have protected by Letters Patent.

We claim:

1. A circuit for the pulsewise energy transmission between line sections, wherein such line sections are terminated with line storers which are connected to multiplex bars over switches operated by sequences of control pulses, comprising a pair of multiplex bars respectively providing a connection build-up in outgoing and incoming directions, a first switch for each line storer over which the latter is connectable to the outgoing multiplex bar and a second switch for each line storer over which the latter is connectable to the incoming multiplex bar, two central intermediate storers which are provided for disposition in the course of the energy transmission paths extending in each case over both multiplex bars, a plurality of central switches over which each intermediate storer is connectable to the two multiplex bars, the operation of such switches being such that one of two line storers is connected to one multiplex bar and the other line storer is simultaneously connected to the other multiplex bar, while the two central intermediate storers are alternately connected over said central switches to the one and also to the other multiplex bar in such manner that energy transmission takes place only to a previously emptied storer, and that after such energy transmissions the two line storers have exchanged their energy content with one another, and the two intermediate storers are available for the energy exchange between other line storers each line storer having one of the first switches controlling connection thereof with said outgoing multiplex bar and having one of said second switches controlling connection thereof with said incoming multiplex bar, so that the same line storer is capable of selective communication with each of said pair of multiplex bars.

2. A circuit according to claim 1, wherein the said intermediate storers include means for effecting an amplification.

3. A circuit according to claim 1, wherein between the line storers and the appropriate line sections low-pass filters are inserted, whose limit frequency is smaller than half the sequence frequency of the control impulses for the switches allocated to the line storers.

4. A circuit according to claim 1, wherein said line storers comprise condensers.

5. A circuit according to claim 4, wherein the intermediate storers comprise coils having inductance.

6. A circuit according to claim 5, wherein the energy transmission to the storer involved in each case takes place in the form of a quarter oscillation in the energy transmission path just switched through by the operation of the switches, and that upon the energy transmission from a condenser serving as line storer to a coil serving as intermediate storer, in each case there follows directly the energy transmission from this coil to another condenser serving as line storer.

7. A circuit according to claim 5, wherein to a coil serving as intermediate storer there is connected in parallel an auxiliary condenser which prevents an interruption of the current in the associated coil between an energy transmission to such coil and an energy transmission from such coil.

8. A circuit according to claim 4, wherein coils having inductance are provided, which are disposed in the energy transmission paths switched through by operation of the switches, and by means of their inductance bring about an energy transmission to the storer involved in the form of a partial oscillation.

9. A circuit according to claim 8, wherein said coils are centrally located.

10. A circuit according to claim 9, wherein said centrally located coils are directly in series with the intermediate storers.

11. A circuit according to claim 9, wherein at least a part of each centrally located coil is inserted in a respective multiplex bar.

12. A circuit according to claim 8, wherein decentrally located coils are inserted between the line storers belonging to the line sections and the multiplex bars.

13. A circuit according to claim 12, wherein the inductance in each case effective for an energy transmission is distributed over a decentralized coil and at least one central coil.

14. A circuit according to claim 5, wherein the central coils and/or the decentralized coils are executed as parametric amplifiers.

15. A circuit according to claim 1, wherein the intermediate storers comprise condensers.

16. A circuit according to claim 15, wherein the condensers serving as intermediate storers are constructed as parametric amplifiers.

17. A circuit according to claim 15, wherein short-circuiting switches are provided cooperable with the condensers serving as intermediate storers, and operable to short-circuit the latter before their charging takes place from a line storer.

18. A circuit according to claim 1, wherein the intermediate storers are constructed as ferromagnetic core storers, which formed from a material with remanence and having, within the working range utilized for energy transmissions, an essentially linear working characteristic curve for the magnetic properties.

19. A circuit according to claim 18, wherein the energy transmisison takes place from a core storer serving as intermediate storer to a line storer by means of a reading pulse, which restores the core storer concerned to its magnetic initial state.

20. A circuit according to claim 18, wherein means is provided for supplying to the core storers serving as intermediate storers in each case before a storage is made thereinto, special restoring pulses which restore the core storers to their exact initial magnetic state.

21. A circuit according to claim 1, wherein the operating time of the switches allocated to the intermediate storers are at most half as long as the operating times for the switches allocated to the line sections.

22. A circuit according to claim 1, wherein the length of the switching through of a transmission path is determined in each case by the operation of that centrally located switch allocated to an intermediate storer over which the involved transmission path extends.

23. A circuit according to claim 1, wherein the line sections to be connected are divided into groups which are connected to pairs of multiplex bars allocated to the groups, in which the multiplex bars involved are connected, over switches belonging to coupling networks, for energy transmissions between connecting line sections.

24. A circuit according to claim 23, wherein there are utilized in each case, for the energy transmissions, two of the centrally located intermediate storers allocated to the involved pairs of multiplex bars.

25. A circuit according to claim 1, wherein for the connection of line sections connected to the same two multiplex bars, there also can be effected additional pulse-wise energy transmissions, whose transmission paths extend exclusively over one of such two multiplex bars.

26. A circuit according to claim 25, in which the control pulses for the switches allocated to the line sections are supplied by a first cyclic storer for addresses of line sections with connection build-up in outgoing direction, and by a second cyclic storer for addresses of line sections with connection build-up in incoming direction, wherein the control pulses for the control of the switches allocated to the line sections for transmissions over the single multiplex bar are delivered exclusively by that cyclic storer in which normally only addresses cycle for line sections with a connection build-up in a direction which corresponds to that of the now exclusively used multiplex bar.

27. A circuit according to claim 25, wherein, for effecting the energy transmission over the two intermediate storers connectable to the single multiplex bar involved, the first cooperable line storer is initially connected, thereupon only the second, and again only the first of such two line storers, to the multiplex bar, that during the connection of the first line storer a temporary connection of the first intermediate storer an energy transmission takes place to the latter, during the connection of the second line storer, first upon an additional temporary connection to the second intermediate storer an energy transmission takes place to the latter, followed by an additional temporary connection to the first intermediate storer an energy transmission takes place to the second line storer, and upon subsequent temporary connection of the first line storer to the second intermediate storer an energy transmission takes place to the first line storer, whereby the line storers have exchanged their energy content with one another and the two intermediate storers are available for the energy exchange between other line storers.

28. A circuit according to claim 25, wherein the transmission paths for connections are continuously conducted over the same multiplex bar if the other multiplex bar is permanently damaged by a ground or voltage short.

29. A circuit according to claim 28, comprising in further combination a monitoring device to which each multiplex bar is connected, which in case of damage to a multiplex bar delivers a signal for a switchover, by means of which the development of the energy transmissions is so changed that the transmission paths will extend only over the other multiplex bar.

30. A circuit according to claim 26, wherein the transmission paths for connections are conducted over the same multiplex bar if one of the two cyclic storers for addresses of line sections is damaged.

31. A circuit according to claim 25, wherein a monitoring device is provided which in case of too frequent occurrence of rare processes or in the case of absence of rare processes, such as improper storage or cancellation of numbers which belong to addresses of line sections, delivers a switchover signal by which, at least temporarily, the development of the energy transmissions is so changed that the transmission paths extend over only one multiplex bar.

32. A circuit according to claim 26, wherein preferred connections are provided for, with the addresses of the corresponding line sections being situated in the two cyclic storers on storage places, in whose proximity are provided free storage places, to which, in case of development of energy transmission paths over only one multiplex bar, the addresses of the line sections in each case associated with such preferred connections are transferrable.

33. A circuit according to claim 32, wherein the maintenance of free storage places exists only as long as such storage places are not needed, as a result of relatively light traffic.

34. A circuit according to claim 32, wherein connections treated as preferred include long-distance connections and connections leading to other stations.

35. A circuit according to claim 32, wherein connections from or to designated parties are treated as preferred connections.

References Cited

UNITED STATES PATENTS

| | | | |
|---|---|---|---|
| 3,233,043 | 2/1966 | Shimasaki | 179—15 |
| 3,061,681 | 10/1962 | Richards | 179—15 |
| 3,182,133 | 5/1965 | Schlichte | 179—15 |
| 2,962,551 | 11/1960 | Johannesen | 179—15 |

RALPH D. BLAKESLEE, *Primary Examiner.*

U.S. Cl. X.R.

179—18.9